US007103599B2

(12) United States Patent
Buford et al.

(10) Patent No.: US 7,103,599 B2
(45) Date of Patent: Sep. 5, 2006

(54) PARSING OF NESTED INTERNET ELECTRONIC MAIL DOCUMENTS

(75) Inventors: John F. Buford, Lexington, MA (US); Xiaolan Huang, Boston, MA (US)

(73) Assignee: Verizon Laboratories Inc., Waltham, MA (US)

( * ) Notice: Subject to any disclaimer, the term of this patent is extended or adjusted under 35 U.S.C. 154(b) by 710 days.

(21) Appl. No.: 09/941,105

(22) Filed: Aug. 28, 2001

(65) Prior Publication Data

US 2003/0041126 A1 Feb. 27, 2003

Related U.S. Application Data

(60) Provisional application No. 60/291,148, filed on May 15, 2001.

(51) Int. Cl.
*G06F 17/30* (2006.01)
*G06F 7/00* (2006.01)

(52) U.S. Cl. .................... 707/10; 709/206; 709/207

(58) Field of Classification Search .................... 707/1, 707/10, 102, 104.1, 2, 200; 709/217, 218, 709/203, 206, 202, 245, 246, 207, 248, 238
See application file for complete search history.

(56) References Cited

U.S. PATENT DOCUMENTS

| | | | | |
|---|---|---|---|---|
| 5,619,648 A * | 4/1997 | Canale et al. | ............... | 709/206 |
| 5,826,022 A * | 10/1998 | Nielsen | ...................... | 709/206 |
| 5,999,932 A * | 12/1999 | Paul | ........................... | 707/10 |
| 6,023,723 A * | 2/2000 | McCormick et al. | ....... | 709/206 |
| 6,167,434 A * | 12/2000 | Pang | .......................... | 709/206 |
| 6,249,807 B1 * | 6/2001 | Shaw et al. | ................. | 709/206 |
| 6,266,692 B1 * | 7/2001 | Greenstein | .................. | 709/206 |
| 6,321,267 B1 * | 11/2001 | Donaldson | .................. | 709/229 |
| 6,421,709 B1 * | 7/2002 | McCormick et al. | ....... | 709/206 |
| 6,529,942 B1 * | 3/2003 | Gilbert | ....................... | 709/206 |
| 6,546,416 B1 * | 4/2003 | Kirsch | ......................... | 709/206 |
| 6,581,105 B1 * | 6/2003 | Miloslavsky et al. | ....... | 709/238 |
| 6,931,433 B1 * | 8/2005 | Ralston et al. | ............. | 709/206 |
| 2004/0064515 A1 * | 4/2004 | Hockey | ...................... | 709/206 |

OTHER PUBLICATIONS

Cauce, Coalition Against Unsolicited Commercial Email, http://www.cauce.org. 1997, 2 pages.*

* cited by examiner

*Primary Examiner*—Jeffrey Gaffin
*Assistant Examiner*—Jacques Veillard
(74) *Attorney, Agent, or Firm*—Leonard C. Suchyta, Esq.; Joseph R. Palmieri, Esq.; Rader, Fishman & Grauer PLLC (57) ABSTRACT

A system and method for automatically processing and responding to large volumes of customer complaints regarding Unsolicited Commercial Email (UCE) and other service disruptions. The complaints include one or more electronic mail (email) documents, each email document including a header and body portion. The process parses the header and body portions from each email document, normalizes the header and body portion by stripping unwanted characters, and extracts specific information relating to the email document from the source of the complaint. The extracted information can be input to a database that can be accessed by the Customer Support Center (CSC) of the Internet Service Provider (ISP).

26 Claims, 10 Drawing Sheets

Received: from burlma1-smarc1.gtei.net (burlma1-smarc1.gtei.net [4.2.35.138])
    by burlma1-smail1.gtei.net (8.9.3/8.9.3) with ESMTP id DAA1236
    for <spamtool@burlma1-smail1.gtei.net>; Wed, 21 Feb 2001 03:59:01 GMT Received:from burlma1-smrt1.gtei.net (burlma1-smrt1.gtei.net [4.2.35.10])
    by burlma1-smarc1.gtei.net (8.9.3/8.9.0) with ESMTP id DAA10589
    for <spamtool@burlma1-smarc1.gtei.net>; Wed, 21 Feb 2001 03:59:00 GMT Received:from burlma1-smfill.gtei.net (burlma1-smfill.gtei.net [4.2.35.139])
    by burlma1-smrt1.gtei.net (8.9.3/8.9.3) with ESMTP id DAA29035
    for <spamtool@genuity.net>; Wed, 21 Feb 2001 03:59:00 GMT Received: (from daemon@localhost)
    by burlma1-smfill.gtei.net (8.9.3/8.9.3) id DAA29035;
    Wed, 21 Feb 2001 03:58:59 GMT Date: Wed, 21 Feb 2001 03:58:59 GMT Message-Id: <200102210238.DAA05004@burlma1-smfill.gtei.net>

To: spamtool@genuity.net

From: Abuse Autoresponder <nobody@genuity.net>

Subject: Abuse Tracking Code BBN=EESN51707

X-Autoresponder-Revsion: 1.18

Content-Type: text                                          61

X-UIDL:A4d9a3018d69ceabd29cb444b104b03e

FIG. 6(a)

The following is the original message sent to abuse.

Received: from columbia1-smrt1.gtei.net (columbia1-smrt1.gtei.net [4.3.3.36])
        by burlma1-smfil1.gtei.net (8.9.3/8.9.0) with ESMTP id DAA04956;
        Wed, 21 Feb 2001 03:58:55 GMT From: pannel@earthlink.net Received: from jaguar.acae.cuhk.edu.hk (jaguar.acae.cuhk.edu.hk [137.189.100.7])
        by columbia1-smrt1.gtei.net (8.9.3/8.9.3) with ESMTP id DAA23131;
        Wed, 21 Feb 2001 03:58:52 GMT Received: from sun15.acae.cuhk.edu.hk (sun15 [137.189.100.25])
        by jaguar.acae.cuhk.edu.hk (8.9.3/8.9.3) with ESMTP id LAA24023;
        Wed, 21 Feb 2001 11:58:45 +0800 (HKT)

Received: from mx03.earthlink.net (max1-76.knoxville.corecomm.net [216.214.23.204])
        by sun15.acae.cuhk.edu.hk (8.9.3/8.9.3) with SMTP id LAA08893;
        Wed, 21 Feb 2001 11:58:41 +0800 (HKT)

FIG 6(b)

Message-ID: <000042c82fdb$00007b53$000020b5@mx03.earthlink.net>

To: <Undisclosed.Recipients@acae.cuhk.edu.hk>

Subject: remove            8373

Date: Tue, 20 Feb 2001 22:55:11 -1700

MIME-Version: 1.0

Content-Type: text/plain;
      charset="Windows-1252"

Content-Transfer-Encoding: 7bit

X-Priority: 3

X-MSMail-Priority: Normal

From:
      webmaster@quatloos.com Save Address - Block Sender

Reply-To:
      jay_adkinsson@msn.com

To:
      <Undisclosed.Recipients@brenno.tread.net> Save Address

Subject:
      Gambling Exposed!!!! 3670

Date:
      Tue, 20 Feb 2001 14:09:28 -1700

| Tracking Code | Receive Line | IP | First Line | URL | Spam Body |
|---|---|---|---|---|---|
| ... | | | | | |
| EESN51707 | Received: From ...2001 11:58:41 +0800 (CST) | 216.214.23.20 | Gambling Exposed | www.quatloos.com | Gambling... mailto: jay_adkinsson @msn.com |
| ... | | | | | |

FIG. 7

PARSING OF NESTED INTERNET ELECTRONIC MAIL DOCUMENTS

CLAIM OF PRIORITY

The application claims the benefit of provisional Patent Application Ser. No. 60/291,148, filed on May 15, 2001.

BACKGROUND OF THE INVENTION

1. Field of the Invention

The present invention relates to the distribution of information over a computer network, and in particular, to a system and method for processing customer complaints by parsing of nested electronic mail documents over a computer network, such as the Internet.

2. Description of the Related Art

The Internet is fast proving to be one of the most significant technological developments of the current era. Originally developed in the United States as a cooperative effort of the United States Government known as the Advanced Research Project Agency Network (ARPANET) to tie universities and research and development organization to their military customers, the Internet has now exploded to link computer users world-wide. The Internet is an interconnected system of computer networks of varying types with terminals, usually computer stations, communicating with each other through a common communication protocol, e.g. Transmission Control Protocol/Internet Protocol (TCP/IP). Through this interconnected system of computer networks, the Internet serves as the underlying infrastructure that facilitates a global system of communication known as the world wide web.

Piggy-backed input on the Public Switched Telephone Network (PSTN), the Internet is available to anyone with a telephone line and a computer with modem. Both businesses and private users are taking advantage of the Internet in rapidly increasing numbers for communications of a diverse nature.

One reason for the rapid integration of the Internet into daily activities is that the Internet provides improved efficiencies in communication. For example, messaging over the Internet is very quick, even to remote locations throughout the world. Responses are also typically very quick.

Internet communication has been minimally regulated and continues to involve lowering costs, typically requiring only the cost of a computer terminal and a periodic Internet Service Provider (ISP) fee. Additionally, Internet communications are pervasive, providing easy access from every user on the Internet to millions of other users, almost regardless of physical location.

Because of these efficiencies, one form of communication that has quickly migrated to the Internet is advertising. Advertisers are able to generate and send bulk mailings at a fraction of the cost of mail, telephone, radio, and other commonly accepted types of advertising. Programs exist that quickly merge commercial advertisement messages with reference lists of Internet user addresses and automatically send out many thousands of advertisements in a single day at almost no cost to the sender. Instead, a substantial portion of the costs is born by the intermediary transmission entities and the end users.

Unfortunately, the indiscriminate nature of broadcast advertising over the Internet has led to many problems. To deliver a message in volume and thereby take advantage of the efficiencies of the Internet, senders frequently use commercially generated reference lists of Internet user addresses. These reference lists are very labor intensive and costly to compile in any manner other than randomly. Thus, many Internet broadcasters use random lists of user addresses to send their advertising, transmitting unwanted messages to a large number of disinterested Internet users for every interested Internet user.

Internet users typically resent this random "junk mail" cluttering up their cyberspace mailboxes. Consequently, random advertising over the Internet in the form of electronic mail is commonly referred to, rather unaffectionately, as "spamming." Angry recipients of this type of Unsolicited Commercial Email (UCE) advertising have gone so far as to react in simultaneous, damaging, electronic backlashes aimed at particularly notorious junk mail-generating entities.

Large volumes of electronic customer complaints (several thousand per month) sent to the Internet Service Provider (ISP) regarding UCE advertisements and other service disruptions are handled by a help desk or Customer Service Center (CSC). The CSC employs full-time staff to analyze and respond to the large volume of complaints. Each complaint requires review, logging, trouble ticket review, correlation with other complaints, response to the complainant, categorization, validation, distribution to appropriate staff, and resolution. Currently, electronic customer spam complaints are manually processed by the ISP. However, the volume of complaints is large and growing.

Accordingly, the inventors of the present invention have recognized a need for automating a significant portion of the manual processing of spam complaints by developing a method and system for the parsing of nested Internet electronic mail documents.

SUMMARY OF THE INVENTION

One aspect of the present invention is to provide a web-based reporting/ticketing application for Tier 1 ISP customer email complaints. Another aspect of the present invention is to provide an application that performs analysis of the structure of email that contains multiple embedded email by parsing of nested Internet electronic mail documents. Because the majority of complaints involve the delivery of unsolicited commercial email (UCE) or spam, the present invention focuses on the processing of spam complaints. However, the principles of the present invention can be applied to the automatic processing of other forms of complaints.

First, the ISP help desk retrieves a complaint regarding an incident from a customer over a computer network, such as the Internet, and the like. The complaint includes one or more nested electronic mail documents and may include, for example, the header and body portions for a UCE and UseNet complaint, trace information from the IP address for a security-related complaint, and the like. The complaint is automatically parsed into a plurality of components, such as a header and a body. The specific fields in the header and body are located and information regarding the complaint is extracted. The extracted information may be input as a record in a database for further examination by the ISP help desk. The ISP help desk may also categorize the complaint to determine an appropriate course of action with respect to the source of the complaint.

The system and method of the invention can be summarized in a few basic steps as follows: 1) retrieving a complaint with one or more nested electronic mail documents from a complainant over a computer network; 2) parsing or separating of the nested electronic mail documents into a plurality of message components, such as a header and a body of the email using a separator; 3) normalizing the spam email for converting at least one of the message components into a common presentation format by stripping unwanted characters using a normalizer; and 4) using an analysis protocol on the spam email to analyze the message components by way of the common presentation format and extract specific information of the message, such as an IP address, a domain name, and an electronic mail address using an extractor.

Various aspects and advantages of this invention will become apparent to those skilled in the art from the following detailed description of the preferred embodiment, when read in light of the accompanying drawings.

DESCRIPTION OF THE PREFERRED EMBODIMENT

Figure 1:
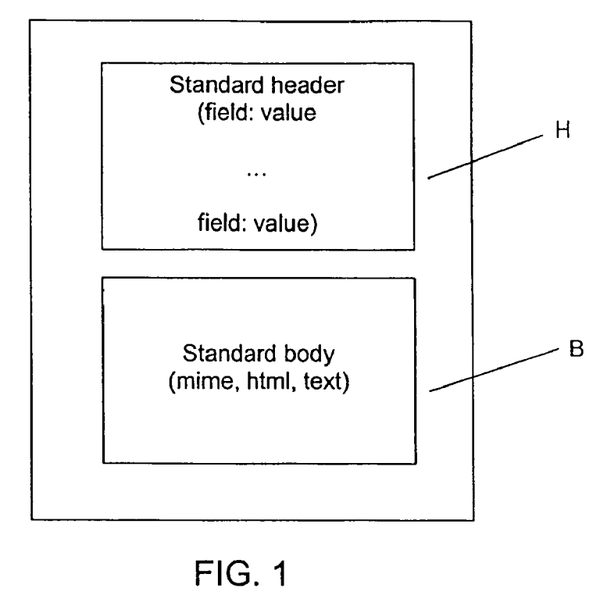
FIG. 1 shows a simple one header, one body electronic mail spam complaint.

Referring now to FIG. 1, the parsing of a complaint email containing nested Internet mail documents according to the invention will now be described. FIG. 1 illustrates a standard simple email structure. The standard email structure includes a header, H, and body, B. The header, H, includes one or more fields followed by a value, for example, field: value. The body, B, may include plain text, a Multi-Media Internet (MIME-type) object, a HyperText Markup Language (HTML) object, or the like.

In general, a complaint is initiated when the source of the Unsolicited Commercial Email (UCE) or spam sends an email over a computer network, such as the Internet, to one or more Internet addresses. The complaint may be, for example, a UCE, a UseNet complaint, a security complaint, and the like. For brevity, the description herein discusses UCE, UBE (spam uttered by nonprofit and advocacy groups whose motives are not commercial) and other service disruptions on the Internet. However, it will be appreciated that the invention is not limited by the different types of complaints discussed herein, and that the invention can be applied to other similar types of complaints that may occur in a network environment.

The Internet end-user that receives the UCE, commonly known as the complainant, reads the email sent from the spam source and receives one or more UCEs. If the complainant decides to complain about the UCE from the spam source, then the complainant can submit a complaint to the Internet Service Provider (ISP) that is the host of the spam sender through web pages. Alternatively, the complainant can send a form attaching the UCE or can send an email to the ISP attaching the UCE.

Figure 2A:
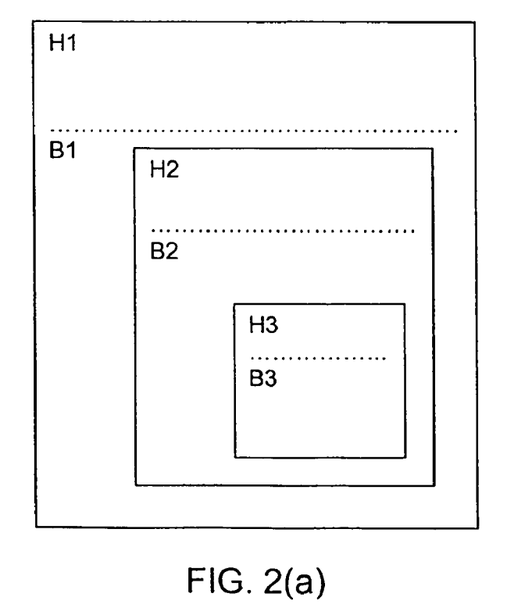
FIGS. 2(a)–(d) show an example of an embedded electronic mail spam complaint and possible format of layers.

As shown in FIGS. 2(a)–(d), the structure of the complaint received by the help desk of the ISP can vary for a variety of reasons. Referring now to FIG. 2(a), the structure of the email spam complaint may comprise, for example, a set of three concatenated email components or messages (H1,B1), (H2,B2) and (H3,B3). The header (H3) and body (B3) of the original spam message is the innermost or third email message (H3,B3). The innermost email message (H3, B3) is forwarded by the complainant by email to the help desk of the Customer Support Center (CSC) in the second email message (H2,B2). Usually, the body B2 concatenates or mime-encapsulates (in plain text and/or HTML formats) one or more copies of the original spam email (H3,B3). An automated tracking system of the ISP may embed each of the incoming complaints in an outermost or third email message (H1,B1). The body B1 concatenates in plain text the complainant email (H2,B2) and may contain the fields: Sender, Tracking Number and Pool. The header H1 may contain a Subject field containing the complaint tracking code.

It will be appreciated that the embedded messages (H1, B1), (H2,B2) and/or (H3,B3) preferably conform to Internet email standard (Internet Engineering Task Force) IETF RFC 822. However, the embedded email messages (H1,B1), (H2,B2) and/or (H3,B3) may or may not be encoded as (Multi-Media Internet) MIME-types (IETF RFC 2045). It has been shown that this type of spam email complaint with three concatenated email messages (H1,B1), (H2,B2) and (H3,B3) is forwarded to the help desk of the ISP by the complainant about 57% of the time.

Figure 2B:
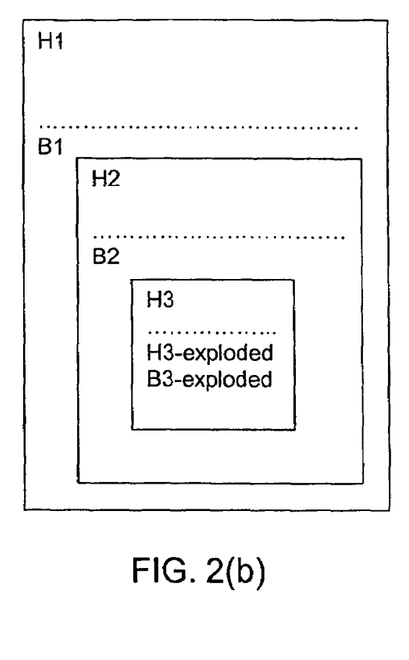

Alternatively, the complainant can find the source of the UCE by using well-known tools available on the Internet, such as SpamCop, that creates and sends an analysis email that includes portions of the original spam. In this case, the Internet tool will generate the second message (H2,B2) with B2 containing H3 (the header of the original spam), an exploded view of H3, and extracts from B3 (the body of the original spam), as shown in FIG. 2(b). It has been shown that this type of spam email complaint with three concatenated email messages (H1,B1), (H2,B2) and (H3,B3) is forwarded to the help desk of the ISP by SpamCop (or other third party) about 35% of the time.

Figure 2C:
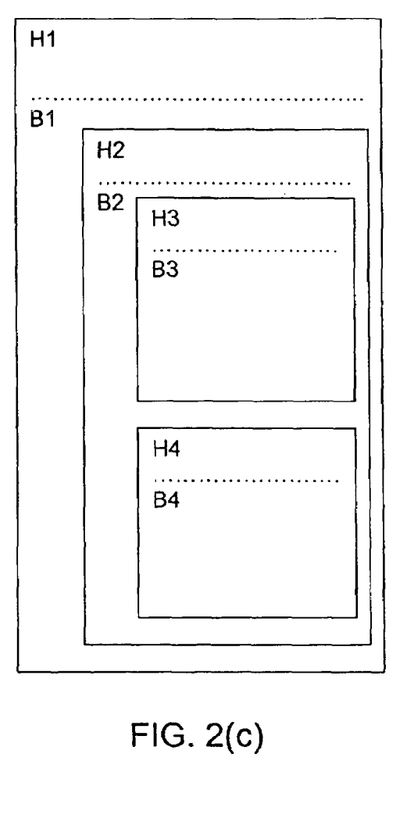

Another possiblity for the structure of the email spam complaint is where two copies of the spam are forwarded in the second message (H2,B2), one in the HyperText Markup Language (HTML) (H3,B3), and the other as a MIME-type object (H4,B4), as shown in FIG. 2(c). It has been shown that this type of spam email complaint with both HTML and MIME objects is forwarded to the help desk of the ISP about 6% of the time.

Figure 2D:
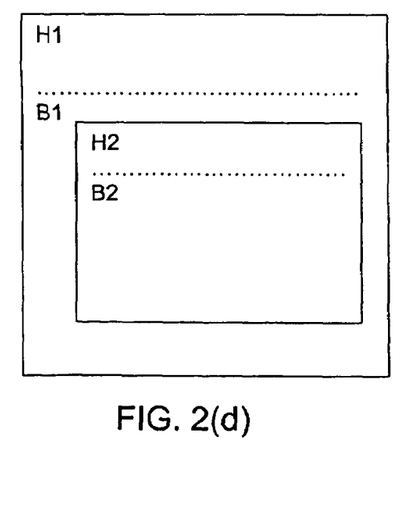

Yet another possibility is that the complainant may omit all or part of the spam complaint. Alternatively, the spam complaint may be included in a corrupted fashion when using the spam tool, or the second header for the spam complaint (H2) may have been hacked by the spammer, as shown in FIG. 2(d). In this case, the message (H1,B1) is the internal tracking labeling, and message (H2,B2) is the complainant. It has been shown that this type of spam email complaint in which the embedded email document does not include a header is forwarded to the help desk of the ISP by the complainant about 1% of the time.

Still yet another possibility is where a spam is sourced from a non-ISP network computer, but because of a configuration problem on an ISP network computer, a third party spam can be forwarded through the ISP network computer. This type of complaint occurs less than 1% of the time.

It will be appreciated that there are variations of the above-mentioned examples that complicate the parsing of nested email messages. For example, one or more blank lines between the header lines may have been unintentionally introduced by the forwarding of the embedded email messages, or may have been intentionally introduced by the spammer. Because a blank line is a separator between the body and header of an email conforming to the IETF RFC 822 standard, the blank line makes it difficult to isolate the body and the header of the email message. Further, some of the embedded email messages may be encapsulated as MIME-type objects that require MIME identification and extraction. Other complaints may be missing a header in the embedded email document or the complaint may only be a single layer email document with nothing embedded at all.

After the help desk of the ISP receives the spam email complaint, the CSC of the ISP may categorize the complaint according to a set of rules adopted by the ISP. The complaint can be categorized as to whether the action for the complaint should either be routed or analyzed by the automated complaint processing system. It will be appreciated that the rules adopted by the ISP to categorize the complaint can be configured according to a particular ISP. An exemplary list of possible complaint categories is given in Table 1.

TABLE I

| Type | Action |
| --- | --- |
| UCE SOURCED from or RELAYED through ISP site | Analyze |
| UCE ADVERTIZING URL or MAILBACK ADDRESS | Analyze |
| UCE to USENET NEWS | Analyze |
| Mailing list complaint | Analyze |
| CREDIT CARD FRAUD—SITE | Route |
| CREDIT CARD FRAUD—SECRET SERVICE | Route |
| CHILD PORNOGRAPHY—SITE | Route |
| CHILD PORNOGRAPHY—U.S. CUSTOMS | Route |
| COPYRIGHT INFRINGEMENT | Route |

As mentioned above, a majority of the complaints received by the help desk of the ISP contains either a concatenated or encapsulated three or more Internet emails. Once the complainant forwards the email to the help desk of the ISP, the next step of the process is to automatically parse the nested electronic mail (email) documents in accordance with the system and method of the invention. The system and method of the invention can be implemented by the use of a central processing unit (CPU) capable of executing software that is written in any well-known programming language.

Figure 3:
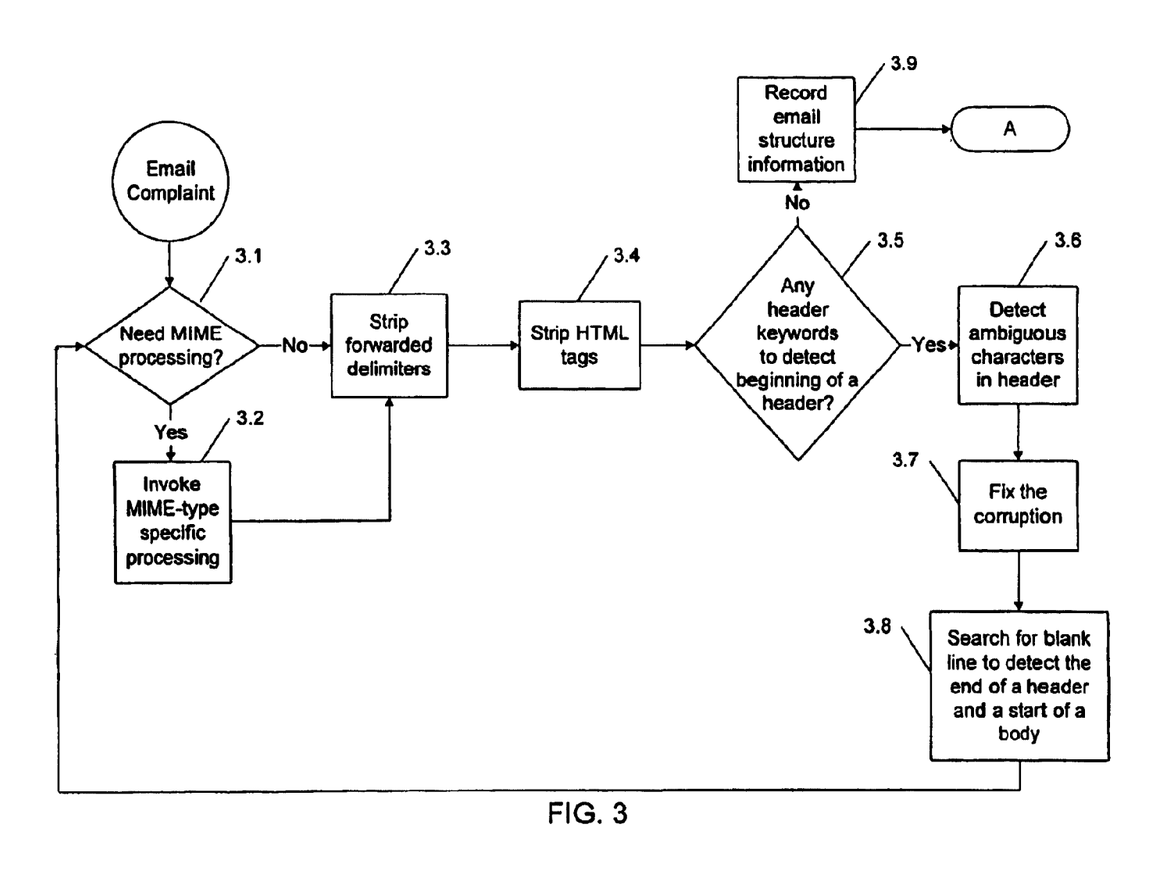
FIG. 3 shows a flowchart of parsing of nested electronic mail documents in which the type of processing (HTML or MIME) and location of the header with multiple lines are determined from the received email complaint according to the invention.

More specifically, after receiving an email complaint with nested electronic mail documents, the process loops through the headers (H1,H2,H3) to separate each header and body (H3,B3), (H2,B2), (H1,B1) to find the source of the spam email contained in header H3 and body B3, and records the email structure status for information purposes. Referring now to FIG. 3, the process determines if the body B3 of the received email includes a mime-type object that requires MIME processing in Step 3.1. If so, then the process invokes MIME-type specific processing in Step 3.2 before proceeding to Step 3.3. If not, then the forwarded delimiters, for example, the symbol ">" at the beginning of the Received lines are stripped or removed in Step 3.3. In addition, the HTML tags are stripped or removed in Step 3.4.

Because a typical email header contains a header keyword followed by an associated value, the process analyzes each line of the header H3 to determine whether any header keywords can be identified to detect the beginning of the header H3 in Step 3.5. An exemplary list of possible header keywords is given in Table II.

TABLE II

| Header Keywords |
| --- |
| Received: |
| From: |
| To: |
| CC: |
| BCC: |
| Subject: |
| Date: |
| X-Mailer: |
| Message-Id: |
| Content-Type: |
| Content-Transfer-Encoding: |
| X-Reply-To: |
| X-Mailer: |
| X-Accept-Language: |
| X-Mozilla-Status: |
| X-Mozilla-Status2: |
| X-Autoresponder-Revision: |
| X-UIDL: |
| Organization: |
| MIME-Version: |
| Reply-To: |

It should be noted that some header keywords can have multiple values, for example, the "Received" header keyword can have multiple values. It will be appreciated that the invention is not limited by the list of header keywords, and that the invention can be practiced by recognizing or detecting any desirable header keys or keywords.

If a header keyword is detected in Step 3.5, then the ambiguous characters in the header, one or more extra blank lines, spaces, header corruption and missing fields are detected in Step 3.6. Then, the corruption is fixed by removing extra spaces and blank lines within the header H3 in Step 3.7. The fix of the ambiguous characters that are corrupted depends on the particular header keyword. Next, the process searches for a blank line to detect the end of a header H3 and a beginning of a body B3 in Step 3.8. At this point, the process loops to Step 3.1 to begin processing another embedded body B2,B1 in the nested electronic mail documents. If in Step 3.5, a header keyword is not detected, the email structure status is recorded to provide information to the ISP regarding email documents that contain unacceptable header and/or body information for review by the ISP in Step 3.9.

Figure 4:
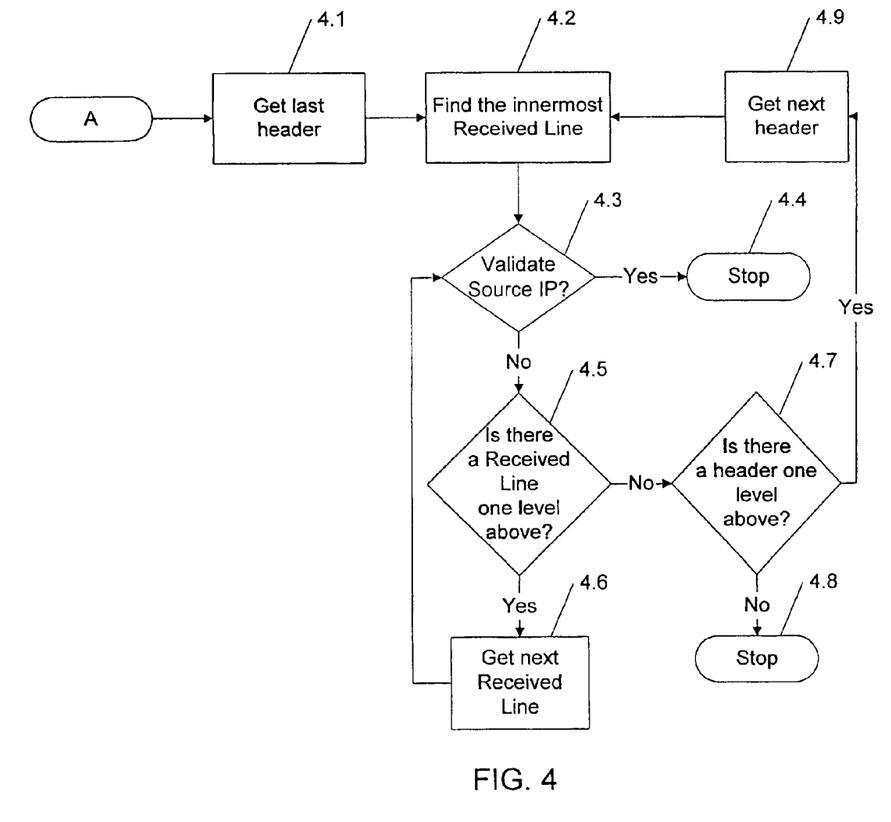
FIG. 4 shows a flowchart of parsing of nested electronic mail documents in which the header with multiple lines of FIG. 3 is processed to locate and validate the embedded email source IP address.
Figure 6A:
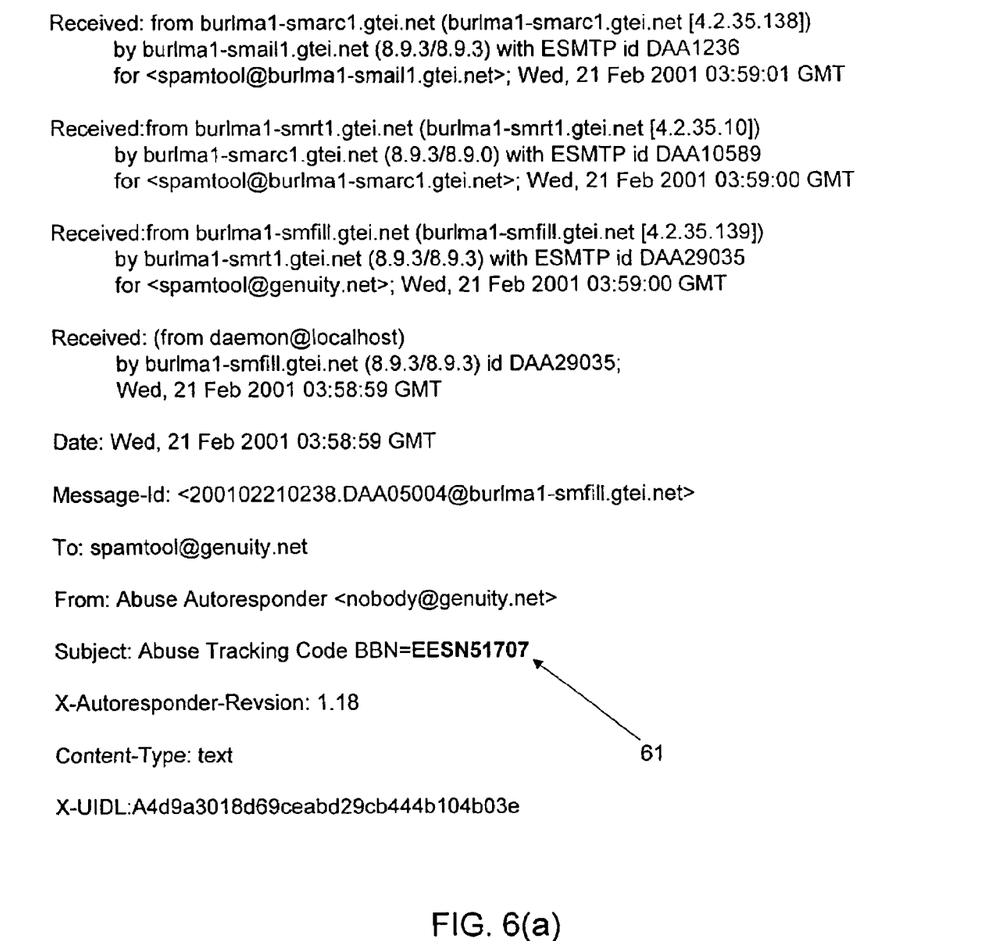
FIG. 6(a)–(d) show an example of a complaint email received at the help desk of the ISP.
Figure 6B:
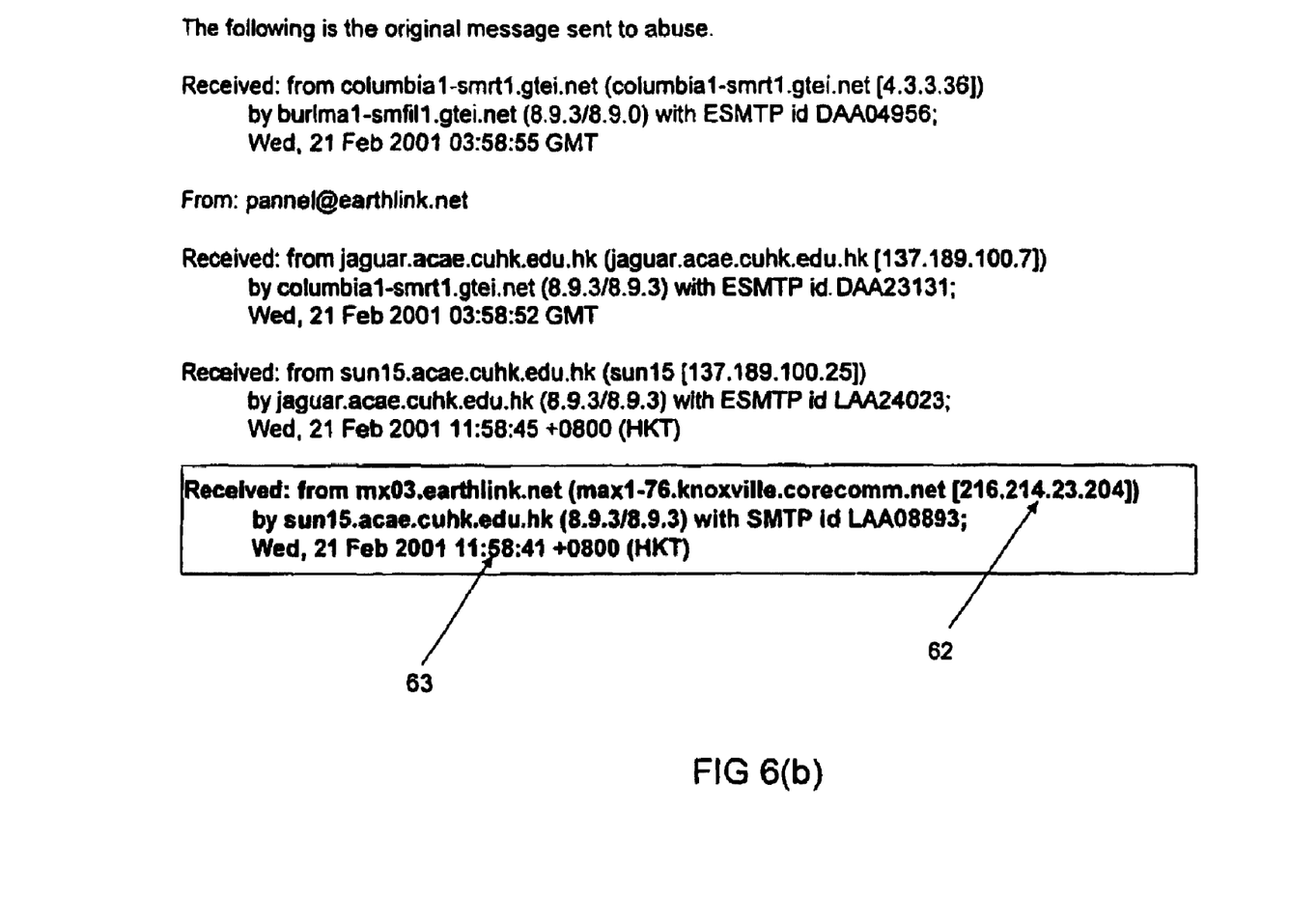
Figure 6C:
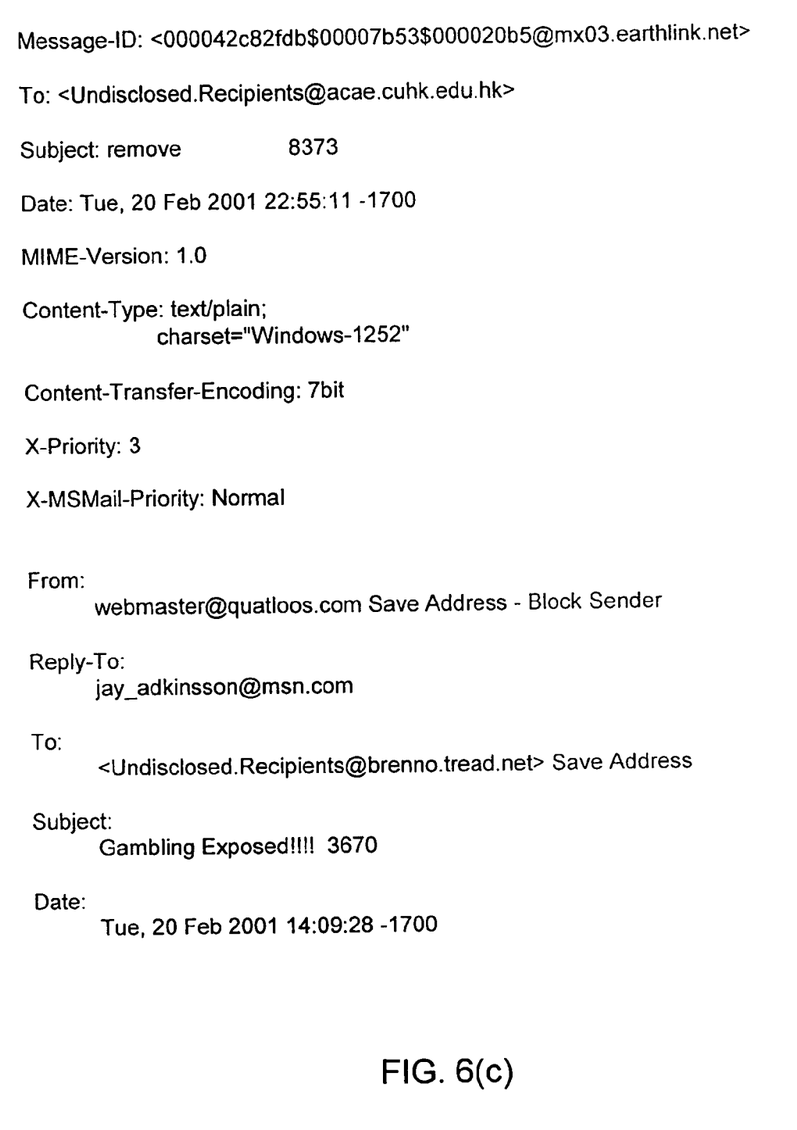
Figure 6D:
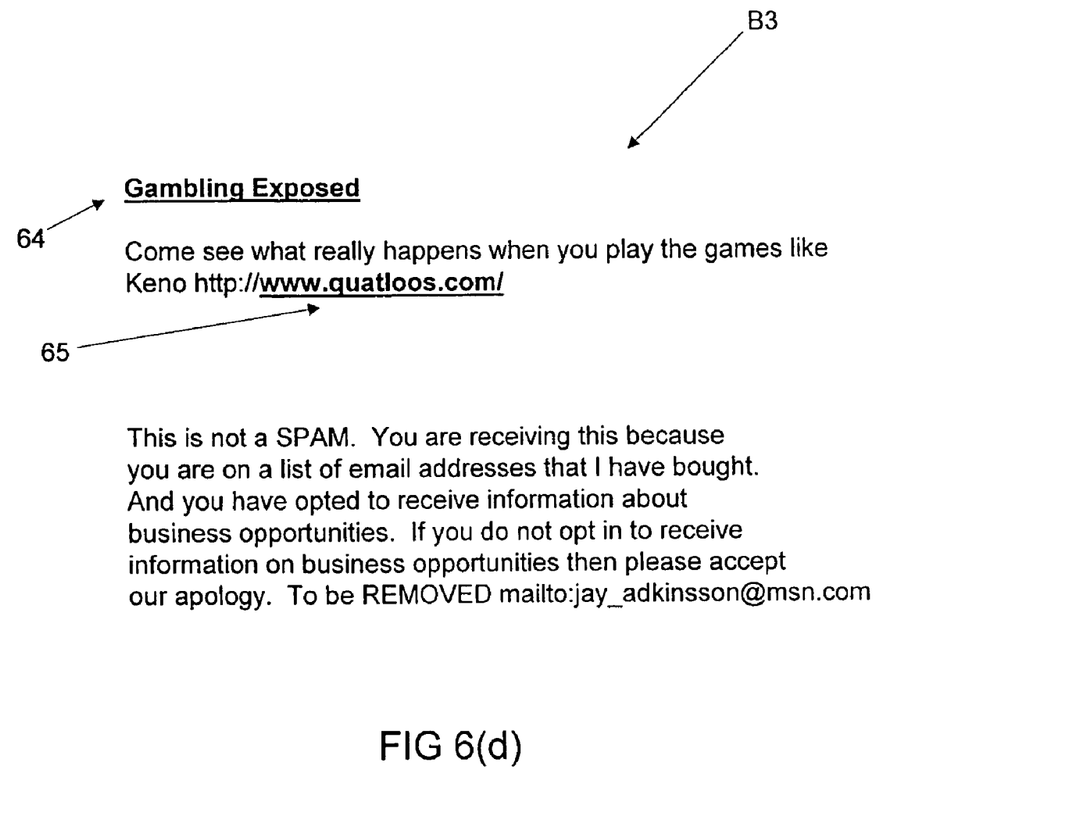

Next, the process loops through the embedded headers H3 to find the source of the spam email and validate the IP address of the spam source using an analysis protocol, as shown in FIG. 4. Then, the last validated header, as shown in FIG. 6(*b*), is obtained to identify the actual source of the embedded email from multiple Received lines of the validated header H3 in Step 4.1. Next, the innermost Received line is located in Step 4.2.

Figure 5:
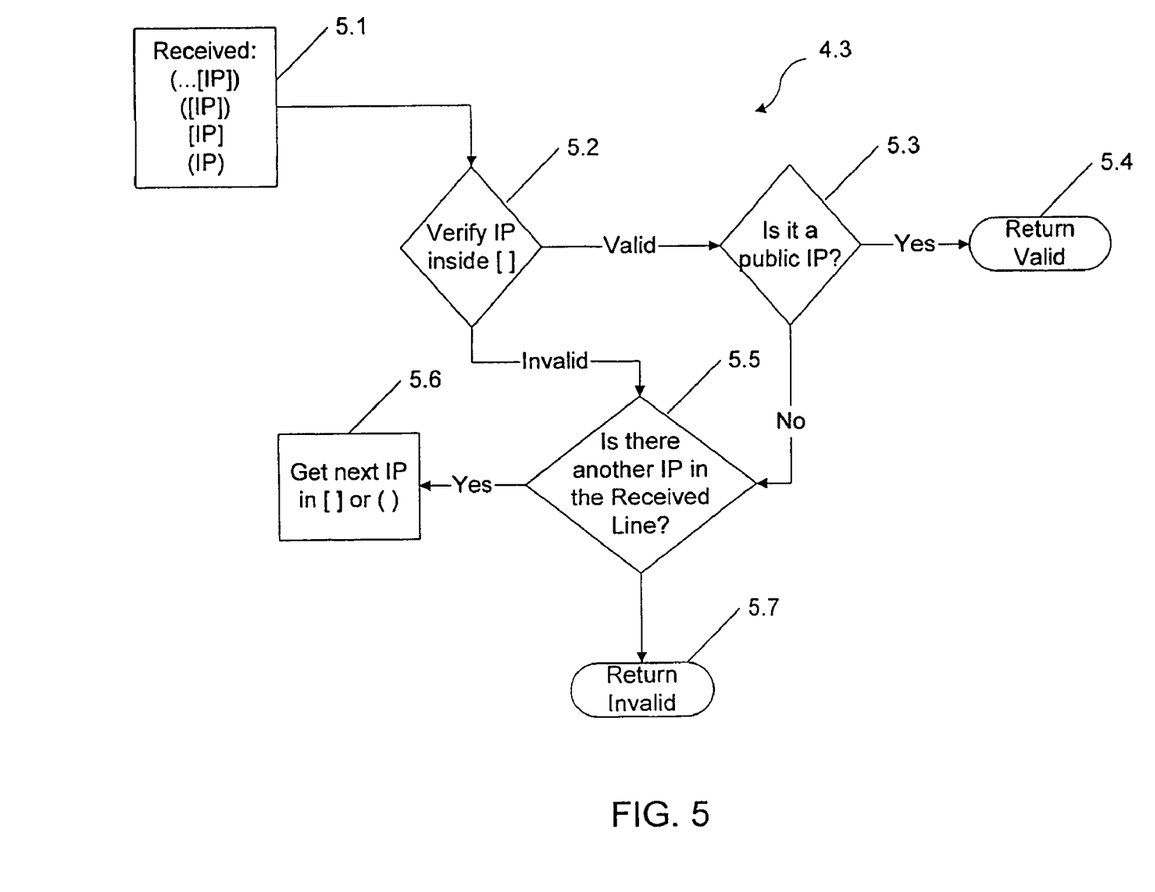
FIG. 5 shows a flowchart of parsing of nested electronic mail documents in which the embedded email source IP address of FIG. 4 is processed to locate the IP address.

Then, the system determines whether the source IP address from the Received line in the header H3 is valid in Step 4.3. A process for validating the source IP address from the Received line is shown in FIG. 5. First, each character of the Received line is examined to locate one or more delimiters in which the source IP address may be located in Step 5.1. Typically, the source IP address conforming to the Internet Information Server protocol (IIS) Version 4.0 is contained within a set of delimiters and is composed of four numbers connected by three dots. The numbers are between 0–255. For example, the source IP address may be contained in the following set of delimiters: ( . . . [IP]), ([IP]), [IP], (IP), and the like. Thus, a valid source IP address may be, for example, [216.214.23.204]. It will be appreciated that the invention is not limited by the set of delimiters and how many numbers are used for the source IP address. For example, the invention can be practiced to identify the source IP address for the IIS Version 5.0, the IIS Version 6.0 protocols, and the like.

Next, the process verifies that the source IP address is contained within the set of delimiters in Step 5.2. When using the IIS Version 4.0 protocols, for example, the source IP address can be verified by determining whether each of the four numbers are between 0 and 255. If so, then the process determines whether the IP address is a public address in Step 5.3 by using any well known methods, such as a lookup table. If so, then the process stops and returns a value to indicate that a valid source IP address has been found at Step 5.4. If not, then the process determines whether another IP address is contained within the Received line in Step 5.5. If another IP address is contained in the Received line, then the process proceeds to Step 5.6 to obtain the next source IP address and returns to Step 5.2 to verify the new source IP address. The process loops through all the Received lines to locate a valid IP source address for the embedded header H3 (Steps 5.2, 5.5 and 5.6). If the process did not find a valid source IP address after looping through all the Received lines, then the process stops and returns a value to indicate that a valid source IP address has not been found at Step 5.7.

It will be appreciated that the invention is not limited by validating the source IP address from the Received Line in the header H3 of the spam email and that the invention can be used to validate other information from the Received Line using other delimiting characters, such as dashes and dots, and the like.

Referring now to FIG. 4, if the process described in FIG. 5 returns a value indicating a valid source IP address, then the process stops in Step 4.4. If the source IP address is invalid, then the process will attempt to locate a Received line in the header at the next higher level for the header H3 in Step 4.5. If a Received line exists in the next higher level for header H3, then the Received line for the higher level for header H3 is obtained in Step 4.6, and the IP address of the spam source from the Received line is validated in Step 4.3. If the process does not find a valid IP address for the spam source for the next higher level header H3 in Step 4.5, the process continues to loop through all the higher level headers H3 in an attempt to locate a Received line (Steps 4.3, 4.5 and 4.6).

If in Step 4.5, a Received line in the header H3 could not be found, then the process determines whether a higher level header H2,H1 exists in Step 4.7. If no other headers exist, then the process stops at Step 4.8. If a header H2,H1 exists, then the header information is obtained from the lower most level within the header H2,H1 in Step 4.9 and the process returns to Step 4.2 to locate the innermost Received line for the higher level header H2,H1. In a manner similar to the manner for header H3 described above, the process continues to loop through all the Received lines for the higher level header H2,H1 to determine a valid IP address for the spam source as described above.

It will be appreciated that the invention can be applied to parsing of electronic mail documents to obtain a variety of other useful information in addition to the IP address for the spam source. For example, referring again to FIG. 2, the body B3 may be parsed to obtain the URL, email address, and telephone number of the spam source. The received from path, from, date, and subject may be parsed from the header H3. The email address of the complainant ("From:") contained in the header H2 may be parsed using the method of the invention. In addition, the "Sender" and "Pool" may be parsed from the body B1.

An example of a complaint email received by the help desk of the ISP is illustrated in FIGS. 6(*a*)–(*d*). From the header H3, the method of the invention automatically parses, for example, the complaint tracking code 61 and the IP address 62 of the spam source from the innermost Received line 63, and the first line 64 of the subject and Universal Resource Locator (URL) 65 from the body B3.

Figure 7:
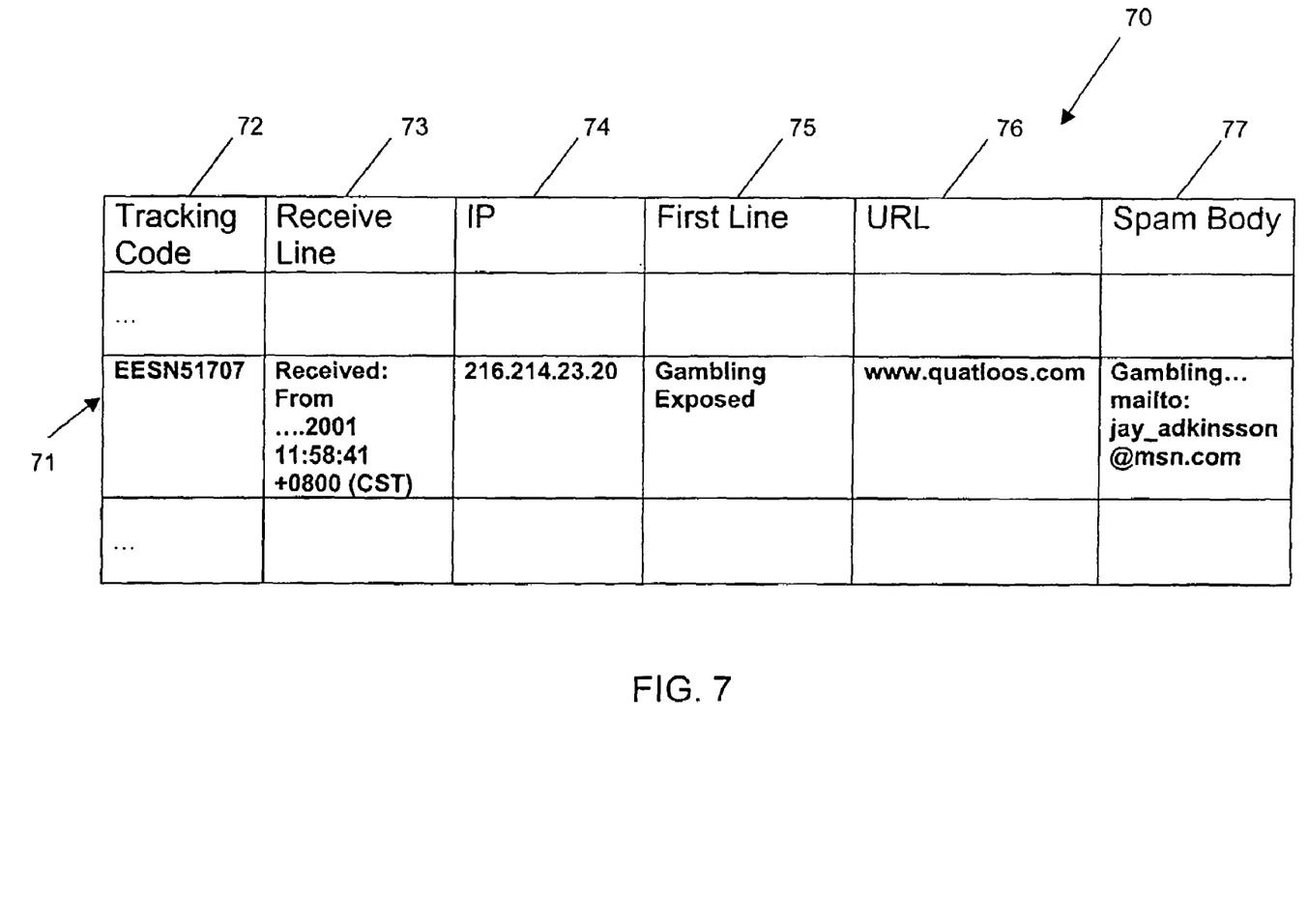
FIG. 7 shows an example of a database containing information extracted from the complaint email of FIG. 6.

The information that is parsed may be automatically entered into a database 70 as a complaint record 71, as shown in FIG. 7. Each record 71 may contain, for example, the complaint tracking code 72, the Received line of the spam 73, the IP address of the spam source 74, the First Line of the spam 75, the URL of the spam source 76, the body of the spam 77, and any other useful information or comments, such as the Spam Number and the Tracking Number. The collection of the information into the database 70 allows the ISP to view reports or generate charts or graphs for a particular spam source. The database 70 may also enable the ISP to search the database 70 for a particular field, for example, the IP address of the spam source.

As described above, one embodiment of the method of the invention has been presented as a set of process flow charts that involve information flow between the UCE source, the customer and the ISP help desk. The flow charts define a general process by which an ISP can streamline and organize the handling of incoming complaints received electronically. This process can not be duplicated by a voice response system because the complaints involve detailed textual information. However, other systems for spam filtering or spam detection can be complimentary to the method of the invention.

It will be appreciated that a different structural embodiment of the method of the invention can occur for a small ISP as compared to a large ISP that would have corresponding different volumes of complaints to handle. For example, a relatively small ISP may coalesce the Level 1 and Level 2 Customer Support Center (CSC) functions for receiving telephone calls and technical support. It will also be appreciated that the invention can be practiced with other CSC level functions, such as Level 3 and Level 4 functions for operations security and network engineering, respectively. Further, different ISPs may have different business policies regarding specific actions to be taken when receiving a complaint. These actions may vary as to the severity and threshold of the complaint.

It will also be appreciated that the invention is a reactive one with many possible variations. One variation of the illustrated embodiment of the invention may include a type of complainant self-service, for example, using a web site for the customer to process a complaint. Generally, customer self-service facilities are secured through login access to permit the customer to see his/her own information. However, the complainant self-service method may be limited to the use of non-proprietary information because some information for processing the complaint may involve information that is proprietary to the customer.

As described above, the invention provides an explicit process that is needed to insure that all complaints are successfully handled, that processing of complaints is done correctly, that legal aspects of certain criminal or fraud relating incidents are handled, and that portions of the process that can be automated using data processing systems can be identified to the extent possible. Without such a system and process in place, an ISP help desk would have an ad hoc system that may not insure that all complaints are handled correctly, and it will be difficult to introduce automation into such an environment.

While the invention has been specifically described in connection with certain specific embodiments thereof, it is to be understood that this is by way of illustration and not of limitation, and the scope of the appended claims should be construed as broadly as the prior art will permit.

The invention claimed is:

1. A method for parsing nested electronic mail documents over a computer network, the method comprising the steps of:
   retrieving a complaint from a complainant about an incident over the computer network;
   parsing the complaint into a plurality of components, wherein the step of parsing includes breaking up an electronic mail message nested in the complaint into the plurality of components;
   normalizing one of the plurality of components; and
   using an analysis protocol on one of the plurality of components to extract information relating to the complaint.

2. The method of claim 1, wherein the parsing step further includes locating a header in one of the plurality of components.

3. The method of claim 2, further including the step of locating a header keyword in the header.

4. The method of claim 3, wherein the normalizing step includes removing at least one character from the header based on the header keyword.

5. The method of claim 1, further including the step of locating a Received line in one of the plurality of components.

6. The method of claim 5, further including the step of validating a source IP address from the Received line.

7. The method of claim 6, wherein the source IP address is validated by locating one or more delimiters in the Received line.

8. The method of claim 1, further including the step of categorizing the complaint into a category.

9. The method of claim 1, wherein the extracted information comprises one of a complaint tracking code, a source IP address, a Received Line, a First Line, a URL, and a body of one of the plurality of components.

10. The method of claim 9, wherein the extracted information forms a record of a database.

11. A method for parsing nested electronic mail documents over a computer network, the method comprising the steps of:
    retrieving a complaint from a complainant about an incident over the computer network;
    parsing the complaint into a body and a header, wherein the step of parsing includes breaking up an electronic mail message nested in the complaint into the body and the header of the complaint;
    normalizing the body and the header of the complaint; and
    extracting specific fields from the body and the header of the complaint using an analysis protocol.

12. The method of claim 11, further including the step of locating a header keyword in the header of the complaint.

13. The method of claim 12, further including the step of removing at least one character from the header based on the header keyword.

14. The method of claim 11, further including the step of locating a Received line in one of the plurality of components.

15. The method of claim 14, further including the step of validating a source IP address from the Received line.

16. The method of claim 15, further including the step of using the Received line to validate an IP address of a source of the complaint.

17. The method of claim 16, wherein the IP address of the source of the complaint is validated by locating one or more delimiters in the Received line.

18. The method of claim 11, further including the step of categorizing the complaint to determine an action based on a category of the complaint.

19. The method of claim 11, wherein the extracted fields comprise one of a complaint tracking code from the header of the complaint, an IP address from the header of the complaint, a Received Line from the header of the complaint, a First Line from the body of the complaint, and a URL from the body of the complaint.

20. A system for processing a complaint received over a computer network, comprising:
    a message parser adapted to break a message into a plurality of message components, wherein the message comprises an electronic mail message nested in the complaint;
    a normalizer for converting at least one of the plurality of message components into a common presentation format associated with that message component; and
    an analysis protocol adapted to analyze the plurality of message components by way of the common presentation format.

21. The system of claim 20, wherein the analysis protocol further includes an extractor adapted to isolate specific information in the message in accordance with predetermined criteria.

22. The system of claim 21, wherein the extractor searches for at least one of an IP address, a domain name, and an electronic mail address.

23. The system of claim 22, wherein the extractor identifies an alphanumeric character associated with the IP address, the domain name or the electronic mail address.

24. The system of claim 20, wherein the message components include a header and a body.

25. A system for processing a complaint relating to a service disruption over a computer network, comprising:
    an organization for providing services for a complainant on a computer network,
    wherein the organization retrieves a complaint from the complainant relating to the service disruption and processes the complaint by parsing the complaint into a plurality of components, normalizing the plurality of components, and extracting specific fields from at least one of the plurality of components of the complaint, and
    wherein the step of parsing includes breaking up an electronic mail message nested in the complaint into the plurality of components.

26. The system according to claim 25, wherein one of the specific fields comprises a source IP address.

* * * * *